US010286486B2

(12) United States Patent
Tanoue et al.

(10) Patent No.: US 10,286,486 B2
(45) Date of Patent: May 14, 2019

(54) LASER WELDING METHOD

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

(72) Inventors: Tomoyuki Tanoue, Toyota (JP); Jyunichiro Makino, Nagakute (JP); Keiichiro Inagaki, Anjo (JP)

(73) Assignees: TOYOTA JIDOSHA KABUSHIKI KAISHA, Toyota (JP); TOYOTA SHATAI KABUSHIKI KAISHA, Kariya-shi (JP)

( * ) Notice: Subject to any disclaimer, the term of this patent is extended or adjusted under 35 U.S.C. 154(b) by 488 days.

(21) Appl. No.: 15/229,745

(22) Filed: Aug. 5, 2016

(65) Prior Publication Data

US 2017/0057010 A1 Mar. 2, 2017

(30) Foreign Application Priority Data

Aug. 26, 2015 (JP) ................................. 2015-167164

(51) Int. Cl.
*B23K 26/06* (2014.01)
*B23K 26/21* (2014.01)
*B23K 26/04* (2014.01)
*B23K 26/08* (2014.01)
*B23K 26/22* (2006.01)
*B23K 26/32* (2014.01)
*B23K 26/082* (2014.01)
(Continued)

(52) U.S. Cl.
CPC .......... *B23K 26/0648* (2013.01); *B23K 26/04* (2013.01); *B23K 26/082* (2015.10); *B23K 26/083* (2013.01); *B23K 26/21* (2015.10); *B23K 26/22* (2013.01); *B23K 26/244* (2015.10); *B23K 26/32* (2013.01); *B23K 2101/18* (2018.08); *B23K 2103/02* (2018.08)

(58) Field of Classification Search
CPC ............................... B23K 26/06; B23K 26/21
USPC ............ 219/121.63–121.72, 121.67, 121.77, 219/121.82
See application file for complete search history.

(56) References Cited

U.S. PATENT DOCUMENTS 7,094,988 B1* 8/2006 Taylor ................ B23K 26/0096
219/121.64
2005/0155956 A1* 7/2005 Hamada ............ B23K 26/0626
219/121.69
(Continued)

FOREIGN PATENT DOCUMENTS

JP S61-238488 A 10/1986
JP H07-076718 A 3/1995
(Continued)

*Primary Examiner* — Samuel M Heinrich
(74) *Attorney, Agent, or Firm* — Oliff PLC

(57) ABSTRACT

A welding apparatus radiates a laser beam to a welding position in a state where a focal spot of the laser beam is in a near-focusing state. The welding apparatus radiates the laser beam to the welding position in a state where the focal spot of the laser beam is in a far-focusing state. The welding apparatus radiates the laser beam to the welding position in the state where the focal spot of the laser beam is in the far-focusing state. The welding apparatus radiates the laser beam to the welding position in a state where the focal spot of the laser beam is in the near-focusing state.

4 Claims, 12 Drawing Sheets

(51) Int. Cl.
*B23K 26/244* (2014.01)
*B23K 101/18* (2006.01)
*B23K 103/02* (2006.01)

(56) References Cited

U.S. PATENT DOCUMENTS

2008/0128952 A1* 6/2008 Le Clere ............... B23K 26/16
 264/400
2012/0298638 A1 11/2012 Beck et al.

FOREIGN PATENT DOCUMENTS

JP 2010-227951 A 10/2010
JP 2013-513486 A 4/2013

* cited by examiner

FIG. 9

| STEP | FOCUSING DIRECTION | TARGET VALUE | | DEVIATION OF FOCAL POSITION ÷10mm | | LASER DIAMETER INCREASE/DECREASE |
|---|---|---|---|---|---|---|
| | | FOCAL POSITION | LASER DIAMETER | FOCAL POSITION | LASER DIAMETER | |
| S11 | NEAR FOCUSING | 30mm | 1300μm | 40mm | 1700μm | INCREASE |
| S12 | FAR FOCUSING | -20mm | 900μm | -10mm | 500μm | DECREASE |
| S13 | FAR FOCUSING | -30mm | 1300μm | -20mm | 900μm | DECREASE |
| S14 | NEAR FOCUSING | 20mm | 900μm | 30mm | 1300μm | INCREASE |

FIG. 10

| STEP | FOCUSING DIRECTION | TARGET VALUE | | DEVIATION OF FOCAL POSITION: −10mm | | LASER DIAMETER INCREASE/DECREASE |
|---|---|---|---|---|---|---|
| | | FOCAL POSITION | LASER DIAMETER | FOCAL POSITION | LASER DIAMETER | |
| S11 | NEAR FOCUSING | 30mm | 1300 μm | 20mm | 900 μm | DECREASE |
| S12 | FAR FOCUSING | −20mm | 900 μm | −30mm | 1300 μm | INCREASE |
| S13 | FAR FOCUSING | −30mm | 1300 μm | −40mm | 1700 μm | INCREASE |
| S14 | NEAR FOCUSING | 20mm | 900 μm | 10mm | 500 μm | DECREASE |

FIG. 11
RELATED ART

| STEP | FOCUSING DIRECTION | TARGET VALUE | | DEVIATION OF FOCAL POSITION ÷10mm | | LASER DIAMETER INCREASE/DECREASE |
|---|---|---|---|---|---|---|
| | | FOCAL POSITION | LASER DIAMETER | FOCAL POSITION | LASER DIAMETER | |
| S101 | NEAR FOCUSING | 30mm | 1300μm | 40mm | 1700μm | INCREASE |
| S102 | NEAR FOCUSING | 20mm | 900μm | 30mm | 1300μm | INCREASE |
| S103 | NEAR FOCUSING | 30mm | 1300μm | 40mm | 1700μm | INCREASE |
| S104 | NEAR FOCUSING | 20mm | 900μm | 30mm | 1300μm | INCREASE |

FIG. 12
RELATED ART

| STEP | FOCUSING DIRECTION | TARGET VALUE | | DEVIATION OF FOCAL POSITION :-10mm | | LASER DIAMETER INCREASE/DECREASE |
|---|---|---|---|---|---|---|
| | | FOCAL POSITION | LASER DIAMETER | FOCAL POSITION | LASER DIAMETER | |
| S101 | NEAR FOCUSING | 30mm | 1300 μm | 20mm | 900 μm | DECREASE |
| S102 | NEAR FOCUSING | 20mm | 900 μm | 10mm | 500 μm | DECREASE |
| S103 | NEAR FOCUSING | 30mm | 1300 μm | 20mm | 900 μm | DECREASE |
| S104 | NEAR FOCUSING | 20mm | 900 μm | 10mm | 500 μm | DECREASE |

LASER WELDING METHOD

INCORPORATION BY REFERENCE

The disclosure of Japanese Patent Application No. 2015-167164 filed on Aug. 26, 2015 including the specification, drawings and abstract is incorporated herein by reference in its entirety.

BACKGROUND OF THE INVENTION

1. Field of the Invention

The present invention relates to a laser welding method.

2. Description of Related Art

As one of welding methods for joining together a stack of a plurality of objects to be welded (e.g., metal sheets), a welding method employing laser welding is widely used for its advantages such as less processing distortion, high-speed welding capability, and fewer residual heat-affected zones. When performing laser welding, focusing a laser beam on a surface of a workpiece composed of a stack of a plurality of objects to be welded causes the diameter of the laser (laser diameter) on the surface (laser-radiated surface) of the workpiece to become smaller and the energy density of the laser to become higher. This may result in a defect, such as perforation, occurring in the workpiece.

In this regard, Japanese Patent Application Publication No. 61-238488 discloses a method in which spot welding is performed by radiating a laser beam to a stack of thin metal sheets. In the method according to JP 61-238488 A, the focal spot of the laser beam is set to be located on the near side at a distance, equivalent to the amount of defocusing, from a surface of the thin metal sheet. Thus, the depth of penetration can be set properly.

When laser welding is performed, the distance between a welding apparatus that radiates a laser beam and a workpiece (workpiece distance) can deviate (vary) from the intended distance (control-target value) due to various factors. Examples of the factors contributing to the deviation of the workpiece distance from the target value include inaccurate positioning of a welding robot, inaccurate robot teaching, displacement of the workpiece, and mechanical errors of the welding apparatus. If the workpiece distance thus varies, the laser diameter also varies. In other words, the laser diameter on the laser-radiated surface will not be stabilized.

In this case, if the laser diameter varies (deviates) in the direction of decreasing from the control-target laser diameter (the target value of the laser diameter), the energy density of the laser in the workpiece becomes too high. This may result in a defect, such as perforation, occurring in the workpiece. Conversely, if the laser diameter varies (deviates) in the direction of increasing from the target value, the energy density of the laser in the workpiece becomes too low. This may result in a lack of fusion into the object to be welded on the rear side (the opposite side from the laser-radiated surface) of the workpiece and, accordingly, in reduced weld strength. Thus, in the method of JP 61-238488 A, the energy density is not stabilized due to the unstable laser diameter, which may make it impossible to perform welding properly.

SUMMARY OF THE INVENTION

The present invention provides a laser welding method by which welding can be performed properly even when the workpiece distance deviates from a control-target distance.

A laser welding method according to one aspect of the present invention is a laser welding method of joining together a plurality of objects to be welded by performing laser welding with a welding apparatus that radiates a laser beam to a workpiece composed of a stack of the plurality of objects to be welded, wherein at least one first step and at least one second step as follows are executed when laser welding is performed at a first welding position of the workpiece. The laser welding method involves: (1) the first step of radiating the laser beam to the first welding position in a state where a position of a focal spot of the laser beam is closer to the welding apparatus than a laser-radiated surface of the workpiece is; and (2) the second step of radiating the laser beam to the first welding position in a state where the position of the focal spot of the laser beam is farther away from the welding apparatus than the laser-radiated surface of the workpiece is.

Thus configured, the laser welding method according to the present invention makes it possible, even when the workpiece distance that is the distance between the welding apparatus and the workpiece deviates from the target value, to perform laser welding by combining a state in which the actual laser diameter is larger than the target value and a state in which the actual laser diameter is smaller than the target value. In this way, even when the workpiece distance deviates from the target value, a constantly raised state or a constantly lowered state of the energy density at the welding position is prevented. As a result, the state of the energy density at the welding position is stabilized. Thus, by the laser welding method according to the present invention, it is possible to perform welding properly even when the workpiece distance deviates from the target value.

In the first step and the second step, the position of the focal spot of the laser beam may be controlled by moving a lens provided in the welding apparatus. Thus configured, the laser welding method according to one aspect of the present invention does not require moving the welding apparatus itself to perform the first step and the second step. Thus, by the laser welding method according to the present invention, it is possible to perform the first step and the second step more easily.

The number of times the first step is performed at the first welding position may be the same as the number of times the second step is performed at the first welding position. Thus configured, the laser welding method according to one aspect of the present invention allows easy control when the first step and the second step are performed. Thus, by the laser welding method according to the present invention, it is possible to stabilize the energy density at the welding position more easily.

Before laser welding is performed at the first welding position of the workpiece, the position of the focal spot may be controlled such that a distance from a laser radiation end to the position of the focal spot equals a distance obtained by subtracting the target value of the position of the focal spot from the target value of the distance to the workpiece.

According to one aspect of the present invention, a laser welding method can be provided by which welding can be performed properly even when the workpiece distance deviates from a control-target distance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a view for describing a case where the workpiece distance has deviated from the target value while laser welding is performed by the laser welding method according to Embodiment 1 (FIG. 7);

FIG. 10 is a view for describing a case where the workpiece distance has deviated from the target value while laser welding is performed by the laser welding method according to Embodiment 1 (FIG. 7);

FIG. 11 is a view for describing a case where the workpiece distance has deviated from the target value while laser welding is performed by a method according to a comparative example; and FIG. 12 is a view for describing a case where the workpiece distance has deviated from the target value while laser welding is performed by the method according to the comparative example.

DETAILED DESCRIPTION OF EMBODIMENTS

Embodiment 1

Figure 1:
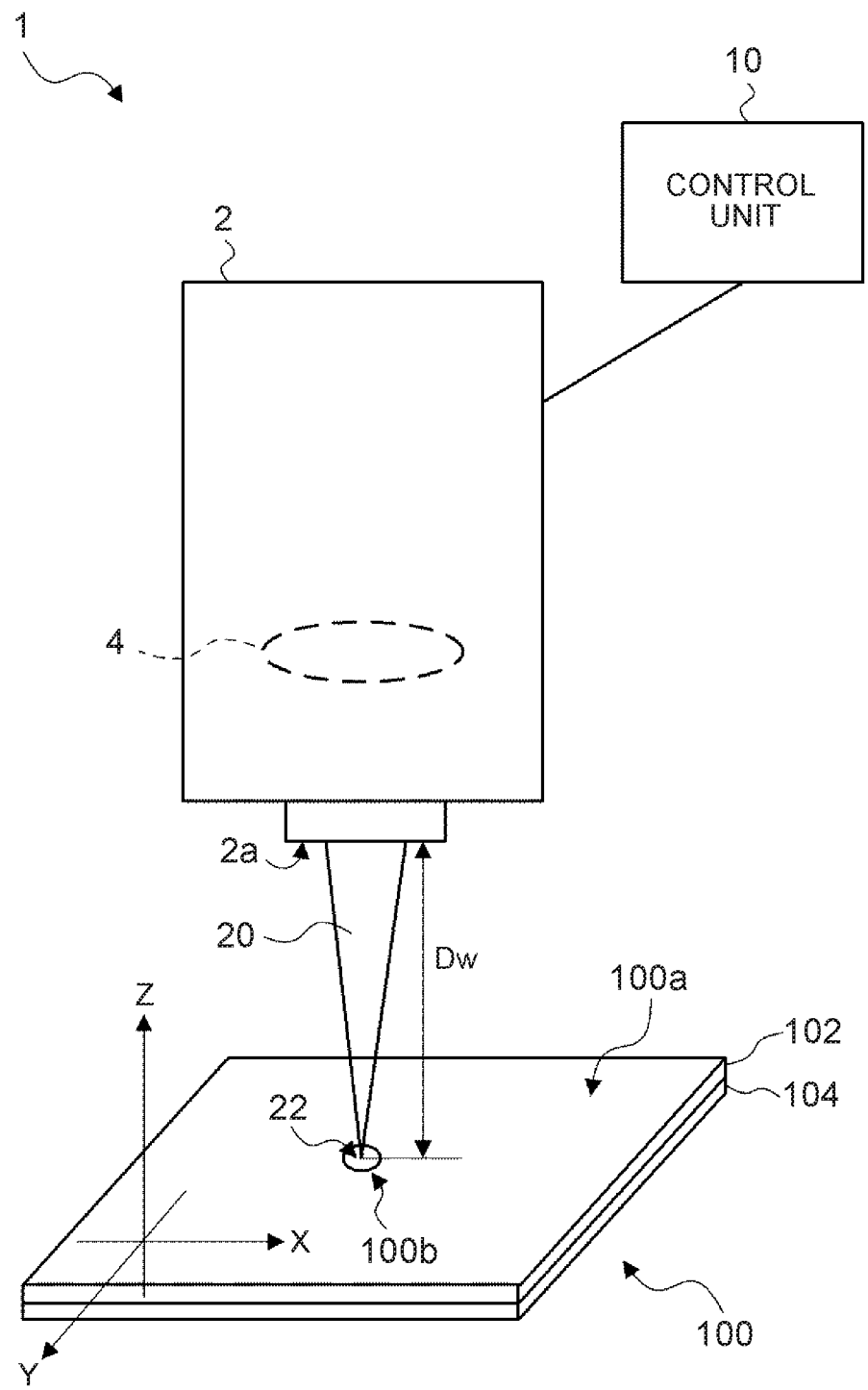
FIG. 1 is a view showing a welding apparatus that employs a laser welding method according to Embodiment 1.

In the following, an embodiment of the present invention will be described with reference to the drawings. FIG. 1 is a view showing a welding apparatus 1 that employs a laser welding method according to Embodiment 1. The welding apparatus 1 has a laser radiation unit 2 and a control unit 10. A lens 4 is provided inside the laser radiation unit 2.

In FIG. 1, the welding apparatus 1 (laser welding apparatus) radiates a laser beam 20 to a workpiece 100. The workpiece 100 is composed of a stack of a steel sheet 102 and a steel sheet 104 that are objects to be welded. The steel sheet 102 and the steel sheet 104 are joined (welded) together by the welding apparatus 1 performing laser welding by radiating the laser beam 20.

Here, the surface of the workpiece 100 to be radiated with the laser beam, i.e., the surface of the workpiece 100 facing the welding apparatus 1, will be referred to as a laser-radiated surface 100a. The distance from the welding apparatus 1 to the laser-radiated surface 100a will be referred to as a workpiece distance Dw. More specifically, the workpiece distance Dw is the distance to the laser-radiated surface 100a from a laser radiation end 2a that is the end of an radiation port through which the laser radiation unit 2 radiates the laser beam 20. The workpiece distance Dw can be controlled by the control unit 10 to a predetermined target value through robot teaching, for example. However, as described above, even when the control unit 10 controls the workpiece distance Dw so as to equal the target value, the actual workpiece distance Dw can deviate from the control-target workpiece distance Dw (the target value of the workpiece distance Dw) due to factors including displacement of the workpiece 100.

The laser radiation unit 2 is, for example, a three-dimensional scanner. The control unit 10 controls the operation of the laser radiation unit 2. The laser radiation unit 2 radiates the laser beam 20 to the laser-radiated surface 100a of the workpiece 100 under the control of the control unit 10. Specifically, the control unit 10 controls the horizontal position of the laser beam 20 such that the laser beam 20 is radiated to a welding position 100b (first welding position) that is the position to be welded in the laser-radiated surface 100a. Moreover, the control unit 10 controls the position of a focal spot 22 of the laser beam 20 in the vertical direction (the direction from the laser-radiated surface 100a toward the welding apparatus 1) by controlling the position of the lens 4.

More specifically, for a coordinate system in an XYZ-space, an XY-plane is defined along the laser-radiated surface 100a, and a Z-axis is defined that is perpendicular to the XY-plane (laser-radiated surface 100a) and positive in the direction from the laser-radiated surface 100a toward the laser radiation unit 2 (welding apparatus 1). Here, Z=0 at the position of the laser-radiated surface 100a in the Z-axis direction. The control unit 10 controls the position in the XY-plane (horizontal position) of the laser beam 20 such that the laser beam 20 is radiated to the welding position 100b of the laser-radiated surface 100a. Moreover, the control unit 10 controls the position in the Z-axis direction (vertical position) of the focal spot 22 of the laser beam 20 by controlling the position in the Z-axis direction of the lens 4. Thus, the diameter of the laser beam 20 (laser diameter Ld) in the laser-radiated surface 100a can be controlled.

The control unit 10 can control the laser radiation unit 2 such that the position in the Z-axis direction of the focal spot 22 of the laser beam 20 becomes closer to the welding apparatus 1 (laser radiation end 2a) than the laser-radiated surface 100a of the workpiece 100 is. Similarly, the control unit 10 can control the laser radiation unit 2 such that the position in the Z-axis direction of the focal spot 22 of the laser beam 20 becomes farther away from the welding apparatus 1 (laser radiation end 2a) than the laser-radiated surface 100a of the workpiece 100 is. Here, the state in which the position of the focal spot 22 is closer to the welding apparatus 1 than the laser-radiated surface 100a of the workpiece 100 is (in other words, the state in which the laser-radiated surface 100a is farther away from the welding apparatus 1 than the position of the focal spot 22 is) will be referred to as a near-focusing state. The state in which the position of the focal spot 22 is farther away from the welding apparatus 1 than the laser-radiated surface 100a of the workpiece 100 is (in other words, the state in which the laser-radiated surface 100a is closer to the welding apparatus 1 than the position of the focal spot 22 is) will be referred to as a far-focusing state. These will be described in detail below.

Figure 2:
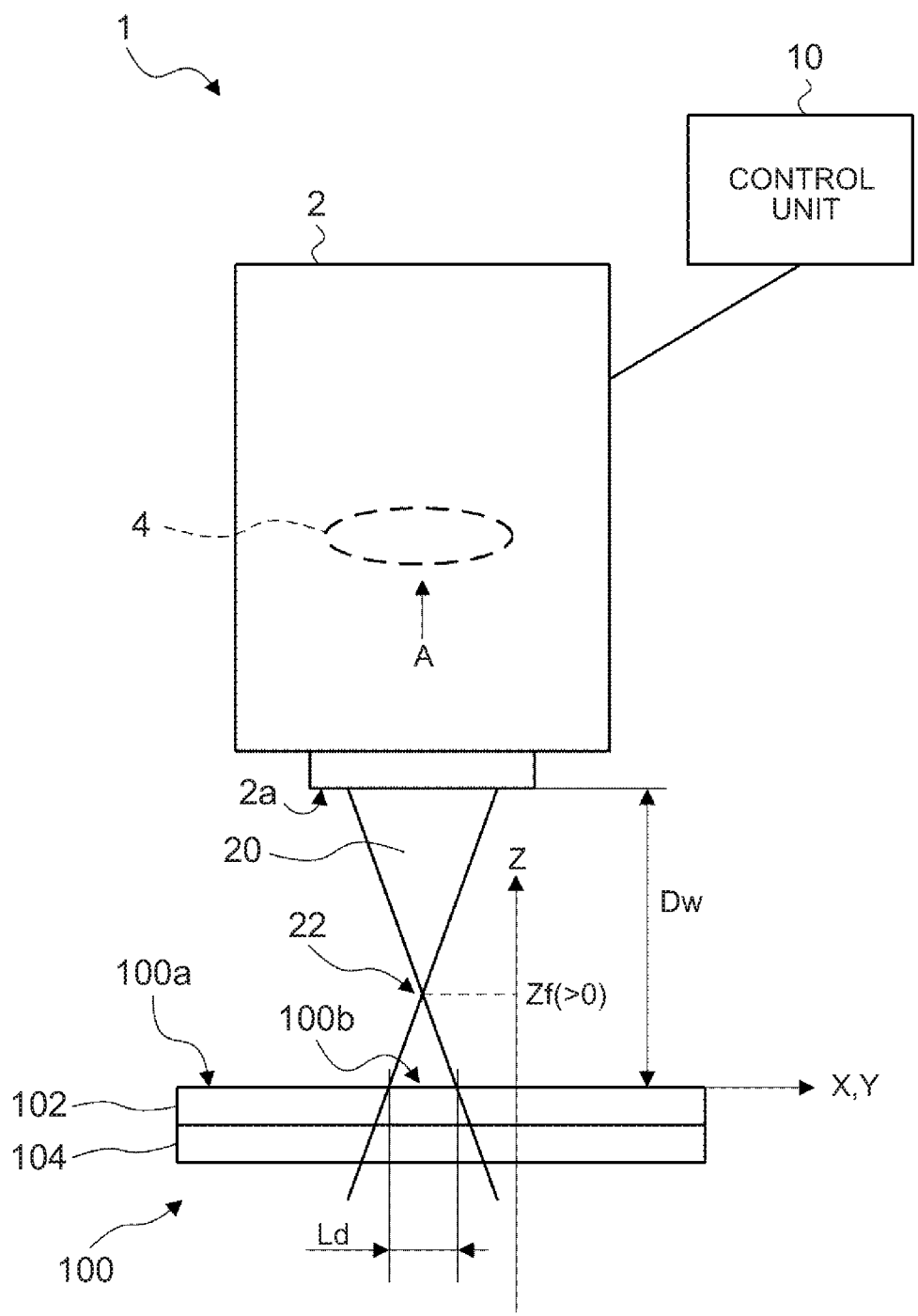
FIG. 2 is a view showing a focal spot in a near-focusing state.

FIG. 2 is a view showing the focal spot 22 in the near-focusing state. For example, the control unit 10 can control the focal spot 22 to be in the near-focusing state by controlling the lens 4 so as to move in the direction away from the laser-radiated surface 100a (in the direction of the arrow A). Here, when the position in the Z-axis direction of the focal spot 22 is denoted by Zf (focal position), the focal position Zf corresponds to the distance from the laser-radiated surface 100a to the focal spot 22 (the direction from the laser-radiated surface 100a toward the welding apparatus 1 is a positive direction). In other words, the focal position Zf corresponds to the amount of defocusing (the amount of displacement of the focal spot 22 from the laser-radiated surface 100a). Here, Zf>0 holds in the near-focusing state.

Figure 3:
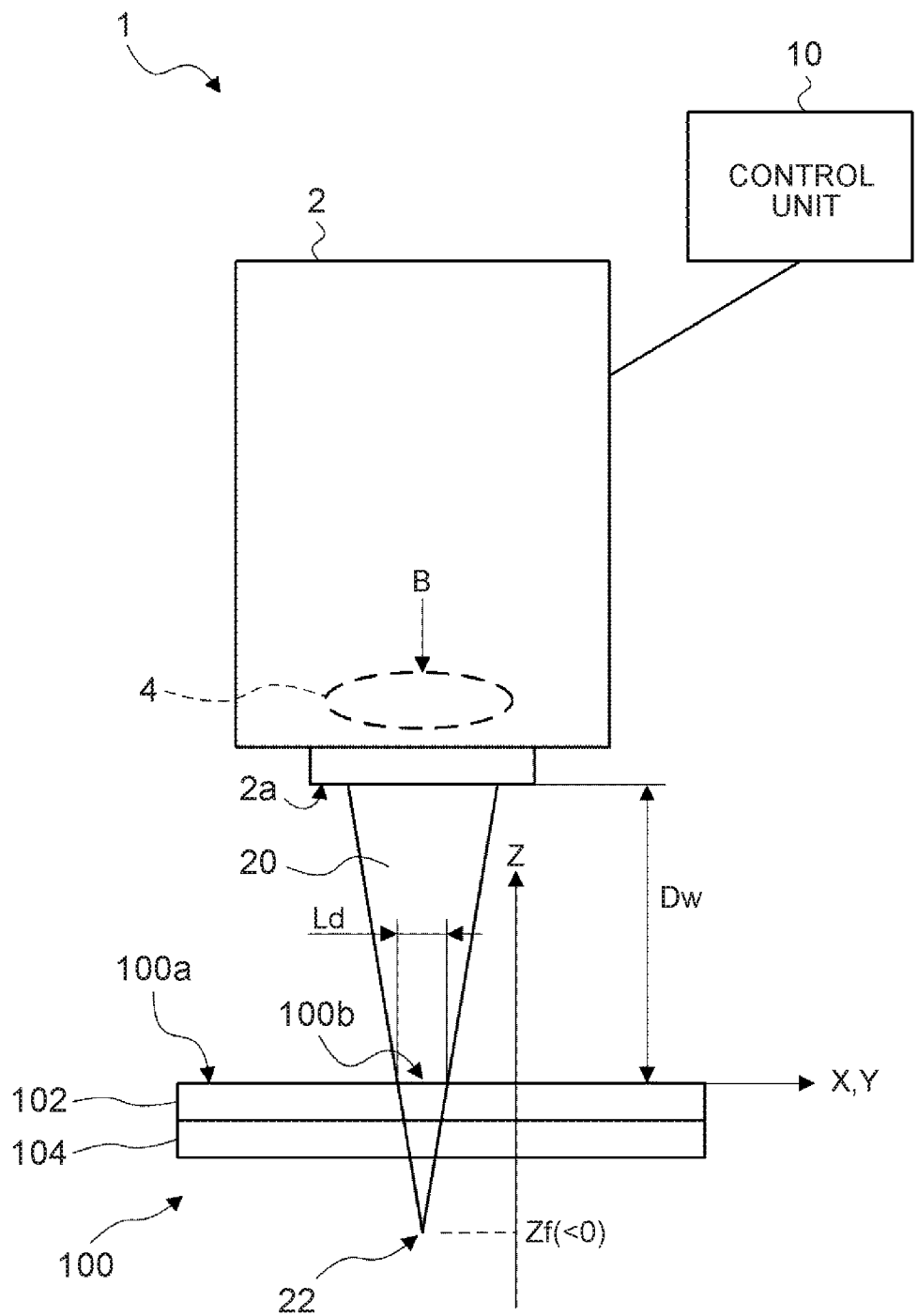
FIG. 3 is a view showing the focal spot in a far-focusing state.

FIG. 3 is a view showing the focal spot 22 in the far-focusing state. For example, the control unit 10 can control the focal spot 22 to be in the far-focusing state by controlling the lens 4 so as to move in the direction toward the laser-radiated surface 100a (in the direction of the arrow B). The focal position Zf corresponds to the distance from the laser-radiated surface 100a to the focal spot 22 (the direction from the laser-radiated surface 100a toward the welding apparatus 1 is a positive direction). Here, Zf<0 holds in the far-focusing state. That is, the absolute value of the distance from the laser-radiated surface 100a to the focal spot 22 is |Zf|.

The welding apparatus 1 according to Embodiment 1 can have the focal spot 22 in the near-focusing state as shown in FIG. 2 as well as can have the focal spot 22 in the far-focusing state as shown in FIG. 3. Here, for example, the control unit 10 of the welding apparatus 1 can store in advance a target value Dw0 of the workpiece distance Dw and a target value Zf0 of the focal position Zf for each welding position 100b in the workpiece 100. In this case, the welding apparatus 1 can be positioned by a robot etc. such that the laser radiation end 2a is located at the height of the workpiece distance Dw from the laser-radiated surface 100a of the workpiece 100. The control unit 10 can control the position of the focal spot 22 such that the distance from the laser radiation end 2a to the position of the focal spot 22 equals Dw0−Zf0. Thus, the control unit 10 can control the focal position Zf to the target value Zf0.

Figure 4:
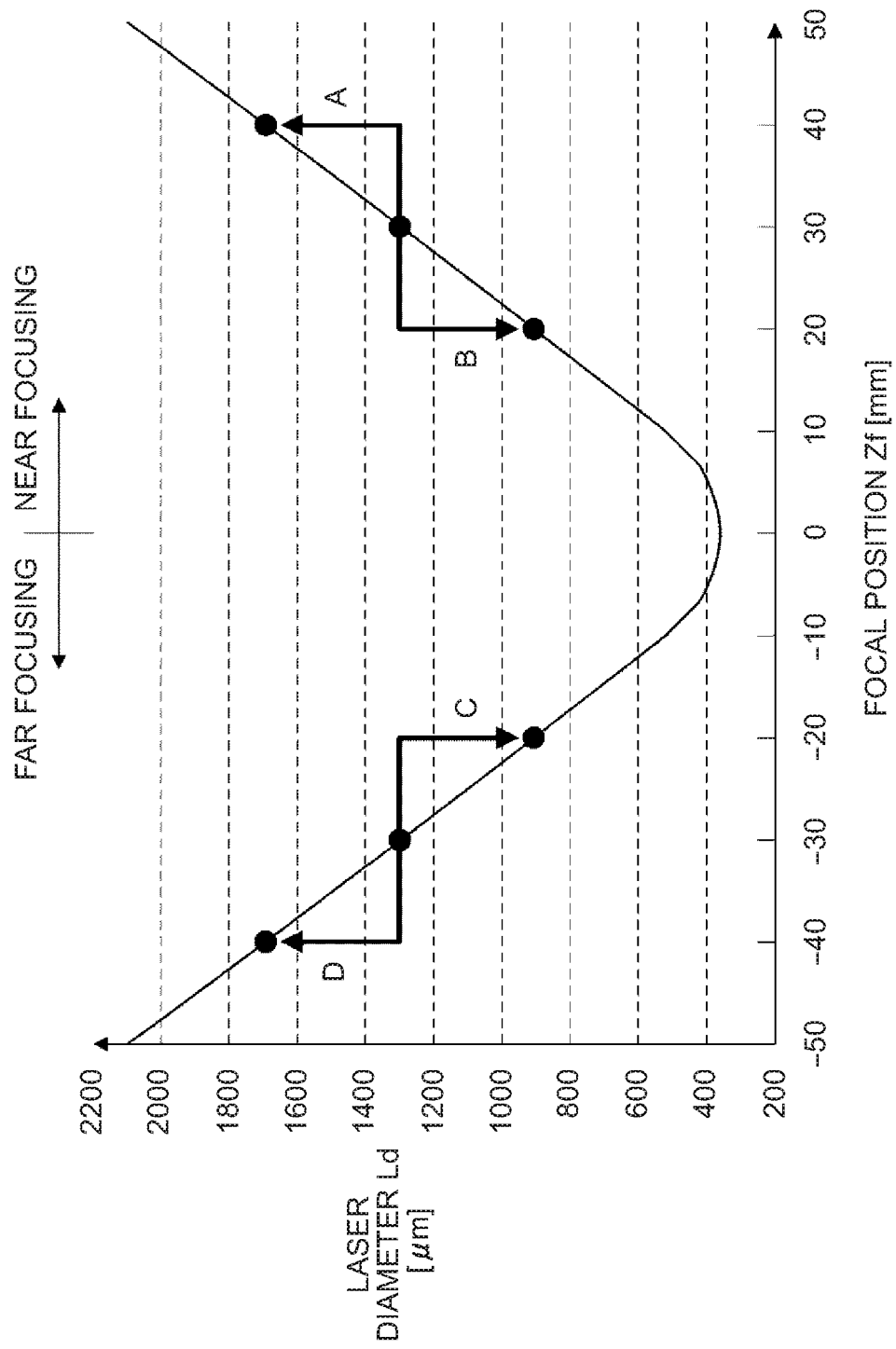
FIG. 4 is a view illustrating a relation between a focal position and a laser diameter.

FIG. 4 is a view illustrating a relation between the focal position Zf and the laser diameter Ld. When the focal position Zf=0, i.e., when the position of the focal spot 22 coincides with the laser-radiated surface 100a, the laser diameter Ld (the diameter of the laser beam 20 in the laser-radiated surface 100a) is minimum. When the focal position Zf>0 (i.e., near-focusing state), the laser diameter Ld increases as the focal position Zf shifts in the positive direction (i.e., as the position of the focal spot 22 becomes closer to the welding apparatus 1). In other words, when the focal position Zf>0 (near focusing), the laser diameter Ld increases as the focal position Zf increases. On the other hand, when the focal position Zf<0 (i.e., far-focusing state), the laser diameter Ld increases as the focal position Zf shifts in the negative direction (i.e., as the position of the focal spot 22 becomes farther away from the welding apparatus 1). In other words, when the focal position Zf<0 (far focusing), the laser diameter Ld increases as the focal position Zf decreases (i.e., as the absolute value of the focal position Zf increases).

For example, in the example shown in FIG. 4, when the focal position Zf is 30 mm, the laser diameter Ld is 1300 μm. When the focal position Zf is 40 mm, the laser diameter Ld is 1700 μm. When the focal position Zf is 20 mm, the laser diameter Ld is 900 μm. When the focal position Zf is −30 mm, the laser diameter Ld is 1300 μm. When the focal position Zf is −40 mm, the laser diameter Ld is 1700 μm. When the focal position Zf is −20 mm, the laser diameter Ld is 900 μm.

Here, as described above, there may be a case in which the workpiece distance Dw deviates from the target value due to displacement of the workpiece 100 etc. For example, this deviation results from inaccurate positioning of the welding robot, inaccurate robot teaching, displacement of the workpiece, and mechanical errors of the welding apparatus as described above. However, it is assumed that the control unit 10 does not recognize the amount of such deviation. The behavior of the control unit 10 when the workpiece distance Dw deviates from the target value Dw0 will be described below using FIG. 5 and FIG. 6.

Figure 5:
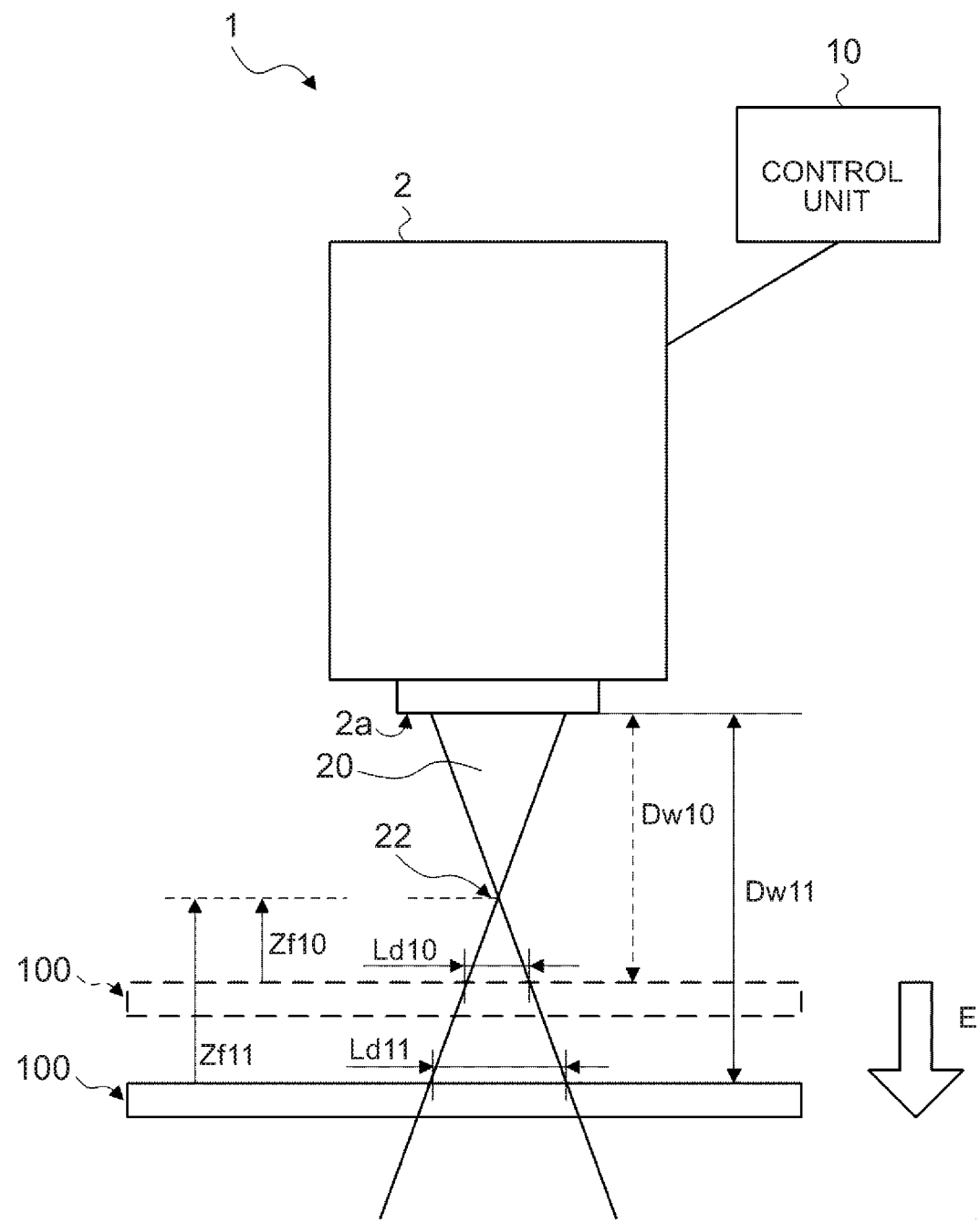
FIG. 5 is a view showing a state in which a workpiece distance has deviated in the direction of increasing from a target value while the focal spot is controlled to be in the near-focusing state.

FIG. 5 is a view showing a state in which the workpiece distance Dw has deviated in the direction of increasing from the target value while the focal spot 22 is controlled to be in the near-focusing state. In FIG. 5, the workpiece 100 at the control-target workpiece distance is indicated by the dashed line. Here, the control-target value of the workpiece distance is Dw10. In this case, the control unit 10 controls the focal position Zf so as to equal the target value Zf10 (>0). In other words, the control unit 10 controls the position of the focal spot 22 such that the distance from the laser radiation end 2a to the position of the focal spot 22 equals Dw10−Zf10. Here, the control-target laser diameter Ld (the target laser diameter that is the target value of the laser diameter Ld) is Ld10.

Now, it is assumed that the workpiece 100 is displaced in the direction away from the welding apparatus 1 as indicated by the arrow E in FIG. 5. A workpiece distance Dw11 in this case is larger than the target value Dw10. On the other hand, the control unit 10 controls the position of the focal spot 22 on the assumption that the workpiece distance Dw is Dw10. Therefore, the control unit 10 controls the position of the focal spot 22 such that the distance from the laser radiation end 2a to the position of the focal spot 22 equals Dw10−Zf10. In this case, an actual focal position Zf11 is larger than the target value Zf10 of the focal position Zf. That is, Zf11>Zf10 holds. Accordingly, the actual laser diameter Ld11 is larger than the target laser diameter Ld10 of the laser diameter Ld. That is, Ld11>Ld10 holds.

Conversely, in a case where the workpiece distance Dw has deviated in the direction of decreasing from the target value (in the opposite direction from the direction of the arrow E) while the focal spot 22 is controlled to be in the near-focusing state, the actual focal position Zf becomes smaller than the target value Zf10. Accordingly, the actual laser diameter Ld becomes smaller than the target laser diameter Ld10. That is, as the workpiece distance Dw deviates from the target value, the focal position Zf deviates from the target value as well as the laser diameter Ld deviates from the target value.

For example, when the target value Zf10 of the focal position Zf is 30 mm, if the focal position Zf deviates+10 mm (i.e., the focal position Zf becomes 40 mm) as indicated by the arrow A in FIG. 4, the laser diameter Ld increases from the target value of 1300 μm to 1700 μm. On the other hand, when the target value Zf10 of the focal position Zf is 30 mm, if the focal position Zf deviates −10 mm (i.e., the focal position Zf becomes 20 mm) as indicated by the arrow B in FIG. 4, the laser diameter Ld decreases from the target value of 1300 μm to 900 μm.

Figure 6:
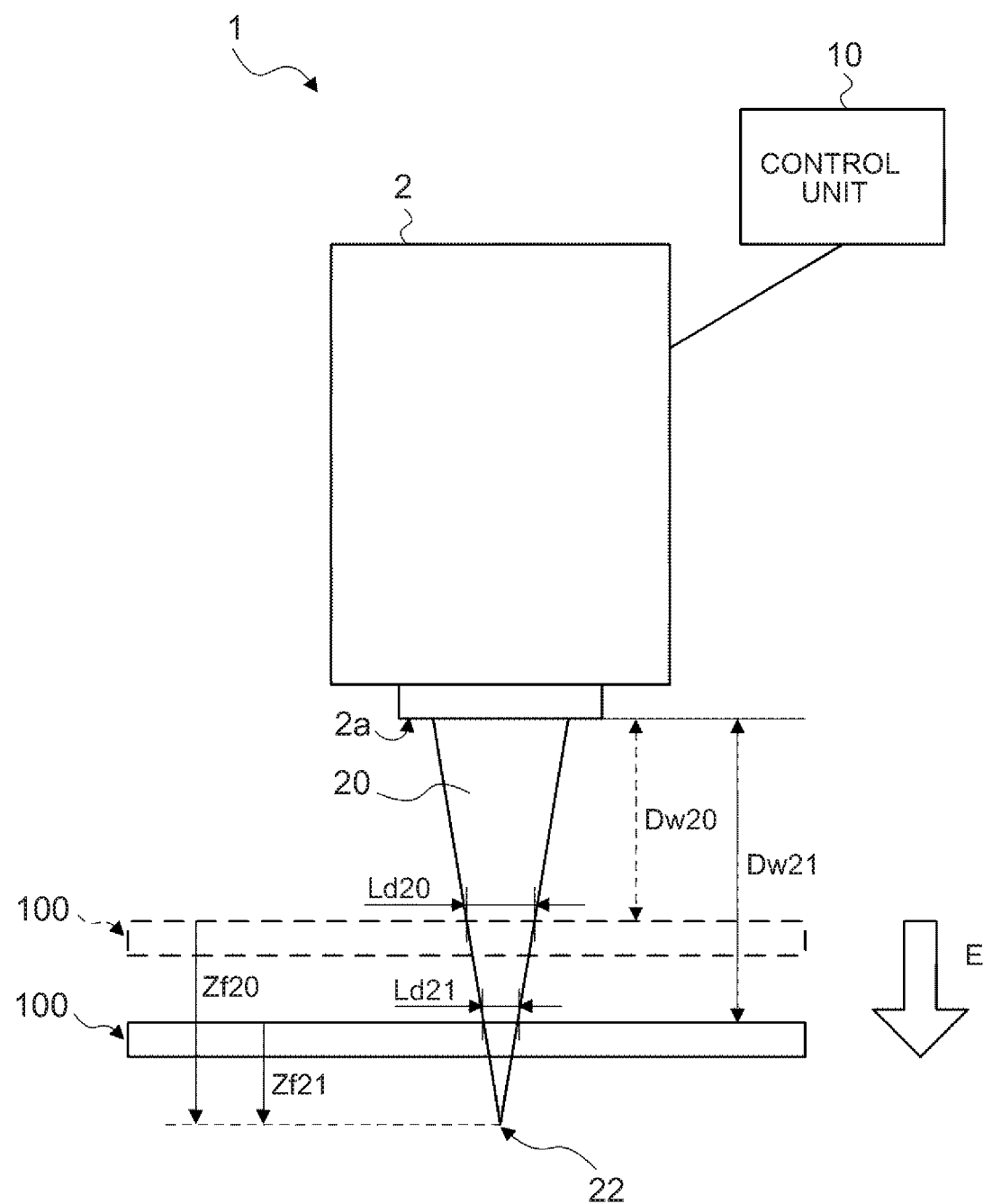
FIG. 6 is a view showing a state in which the workpiece distance has deviated in the direction of increasing from the target value while the focal spot is controlled to be in the far-focusing state.

FIG. 6 is a view showing a state in which the workpiece distance Dw has deviated in the direction of increasing from the target value while the focal spot 22 is controlled to be in the far-focusing state. In FIG. 6, the workpiece 100 at the control-target workpiece distance is indicated by the dashed line. Here, the control-target value of the workpiece distance is Dw20. In this case, the control unit 10 controls the focal position Zf so as to equal the target value Zf20 (<0). In other words, the control unit 10 controls the position of the focal spot 22 such that the distance from the laser radiation end 2a to the position of the focal spot 22 equals Dw20−Zf20. Here, the control-target laser diameter Ld (the target laser diameter that is the target value of the laser diameter Ld) is Ld20.

Now, it is assumed that the workpiece 100 is displaced in the direction away from the welding apparatus 1 as indicated by the arrow E in FIG. 6. A workpiece distance Dw21 in this case is larger than the target value Dw20. On the other hand, the control unit 10 controls the position of the focal spot 22 on the assumption that the workpiece distance Dw is Dw20. Therefore, the control unit 10 controls the position of the focal spot 22 such that the distance from the laser radiation end 2a to the position of the focal spot 22 equals Dw20−Zf20. In this case, an actual focal position Zf21 (<0) is larger than the target value Zf20 of the focal position Zf. In other words, the absolute value of the actual focal position Zf21 is smaller than the absolute value of the target value Zf20. That is, 0>Zf21>Zf20 holds. Accordingly, an actual laser diameter Ld21 becomes smaller than the target laser diameter Ld20 of the laser diameter Ld. That is, Ld21<Ld20 holds.

Conversely, if the workpiece distance Dw has deviated in the direction of decreasing from the target value (in the opposite direction from the direction of the arrow E) while the focal spot 22 is controlled to be in the far-focusing state, the actual focal position Zf (<0) becomes smaller than the target value Zf20 of the focal position Zf. In other words, the absolute value of the actual focal position Zf becomes larger than the absolute value of the target value Zf20. Accordingly, the actual laser diameter Ld becomes larger than the target laser diameter Ld20. That is, as the workpiece distance Dw deviates from the target value, the focal position Zf deviates from the target value as well as the laser diameter Ld deviates from the target value.

For example, when the target value Zf20 of the focal position Zf is −30 mm, if the focal position Zf deviates +10 mm (i.e., the focal position Zf becomes −20 mm) as indicated by the arrow C in FIG. 4, the laser diameter Ld decreases from the target value of 1300 μm to 900 μm. On the other hand, when the target value Zf20 of the focal position Zf is −30 mm, if the focal position Zf deviates −10 mm (i.e., the focal position Zf becomes −40 mm) as indicated by the arrow D in FIG. 4, the laser diameter Ld increases from the target value of 1300 μm to 1700 μm.

As described above, if the workpiece distance Dw deviates so as to increase from the target value, the laser diameter Ld increases from the target value in the near-focusing state, while the laser diameter Ld decreases from the target value in the far-focusing state. Conversely, when the workpiece distance Dw deviates so as to decrease from the target value, the laser diameter Ld decreases from the target value in the near-focusing state, while the laser diameter Ld increases from the target value in the far-focusing state. As will be described below, the laser welding method according to Embodiment 1 is implemented with these characteristics taken into account.

Figure 7:
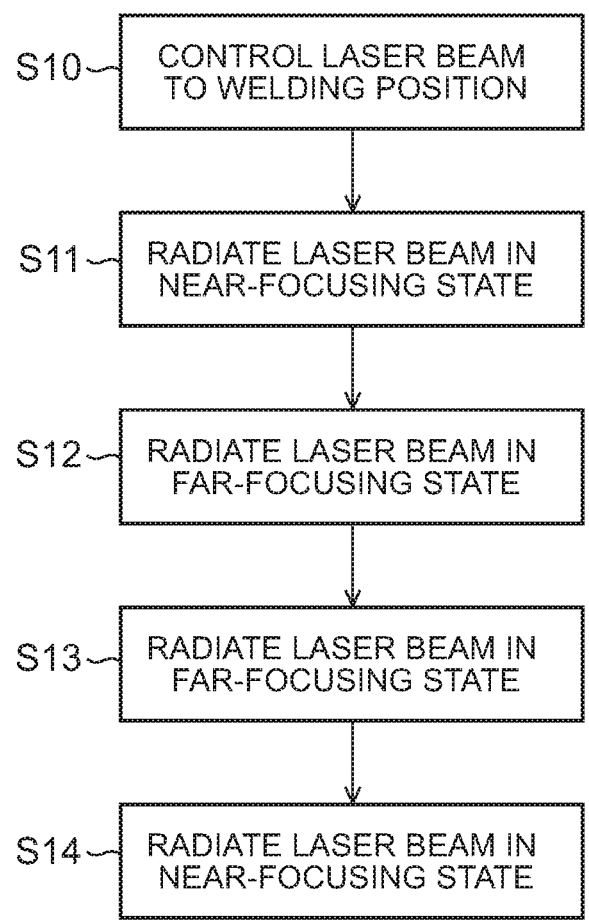
FIG. 7 is a flowchart showing the laser welding method according to Embodiment 1.

Next, the laser welding method according to Embodiment 1 will be described. FIG. 7 is a flowchart showing the laser welding method according to Embodiment 1. First, the welding apparatus 1 controls the horizontal position of the laser beam 20 to the welding position 100b (step S10). Specifically, the control unit 10 of the welding apparatus 1 controls the center position of the laser beam 20 in the XY-plane so as to correspond to the welding position 100b in the laser-radiated surface 100a of the workpiece 100.

Thus, the laser beam 20 can be radiated to the welding position 100b of the laser-radiated surface 100a.

Figure 8:
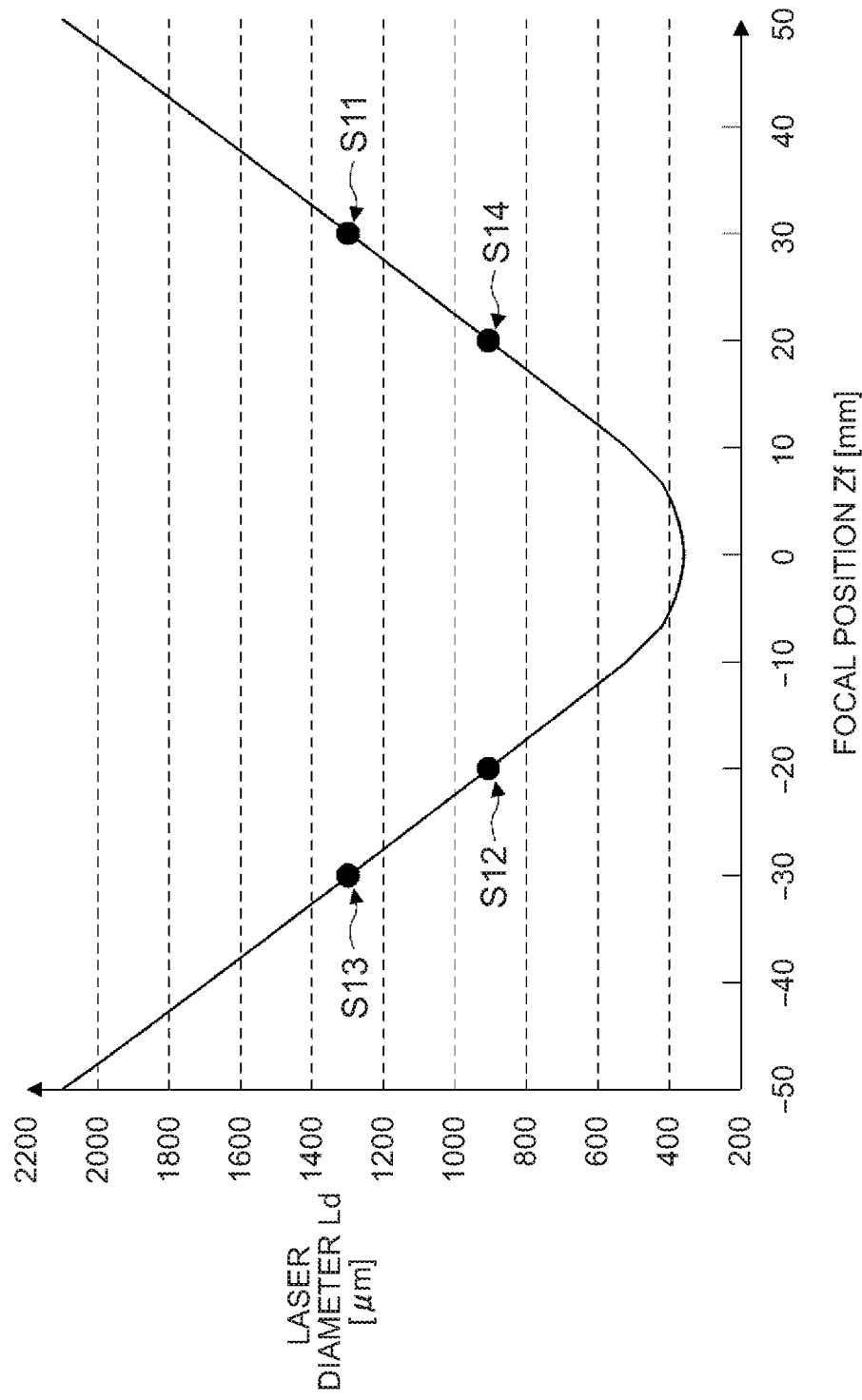
FIG. 8 is a view illustrating target values of the focal position in the respective steps of FIG. 7.

FIG. 8 is a view illustrating the target values of the focal position in the respective steps S11 to S14 of FIG. 7. In steps S11 to S14 to be shown below, the welding apparatus 1 controls the focal position Zf so as to mix the near-focusing state and the far-focusing state. In other words, when performing laser welding at a certain welding position 100b, the welding apparatus 1 according to Embodiment 1 radiates the laser beam 20 to the welding position 100b in the near-focusing state and the far-focusing state. That is, the control unit 10 of the welding apparatus 1 controls the lens 4 so as to move closer to or farther away from the workpiece 100. In other words, in the laser welding method according to Embodiment 1, when laser welding is performed at the welding position 100b, a step of radiating the laser beam 20 to the welding position 100b in a state where a position of the focal spot 22 is in the near-focusing state (first step) and a step of radiating the laser beam 20 to the welding position 100b in a state where the position of the focal spot 22 is in the far-focusing state (second step) are executed. The welding apparatus 1 may keep radiating the laser beam 20 while proceeding from one step to another of steps S11 to S14 (i.e., while the lens 4 is in motion). Alternatively, the welding apparatus 1 may stop radiating the laser beam 20 before proceeding to a next step, and may resume radiating the laser beam 20 when the lens 4 has moved to a position corresponding to the next step.

The welding apparatus 1 radiates the laser beam 20 to the welding position 100b in a state where the focal spot 22 of the laser beam 20 is in the near-focusing state (step S11). Specifically, as illustrated in FIG. 8, the control unit 10 of the welding apparatus 1 controls the laser radiation unit 2 such that the focal position Zf becomes 30 mm, for example. In other words, the control unit 10 controls the lens 4 with the target value of the focal position Zf set to 30 mm. In this case, if the workpiece distance Dw has not deviated from the target value, the laser diameter Ld becomes 1300 μm. While maintaining this state, the welding apparatus 1 radiates the laser beam 20 to the welding position 100b for a predetermined duration (e.g., approximately 0.1 second).

Next, the welding apparatus 1 radiates the laser beam 20 to the welding position 100b in a state where the focal spot 22 of the laser beam 20 is in the far-focusing state (step S12). Specifically, as illustrated in FIG. 8, the control unit 10 of the welding apparatus 1 controls the laser radiation unit 2 such that the focal position Zf becomes −20 mm, for example. In other words, the control unit 10 controls the lens 4 with the target value of the focal position Zf set to −20 mm. In this case, if the workpiece distance Dw has not deviated from the target value, the laser diameter Ld becomes 900 μm. While maintaining this state, the welding apparatus 1 radiates the laser beam 20 to the welding position 100b for a predetermined duration (e.g., approximately 0.1 second).

Next, the welding apparatus 1 radiates the laser beam 20 to the welding position 100b in a state where the focal spot 22 of the laser beam 20 is in the far-focusing state (step S13). Specifically, as illustrated in FIG. 8, the control unit 10 of the welding apparatus 1 controls the laser radiation unit 2 such that the focal position Zf becomes −30 mm, for example. In other words, the control unit 10 controls the lens 4 with the target value of the focal position Zf set to −30 mm. In this case, if the workpiece distance Dw has not deviated from the target value, the laser diameter Ld becomes 1300 μm. While maintaining this state, the welding apparatus 1 radiates the laser beam 20 to the welding position 100b for a predetermined duration (e.g., approximately 0.1 second).

Next, the welding apparatus 1 radiates the laser beam 20 to the welding position 100b in a state where the focal spot 22 of the laser beam 20 is in the near-focusing state (step S14). Specifically, as illustrated in FIG. 8, the control unit 10 of the welding apparatus 1 controls the laser radiation unit 2 such that the focal position Zf becomes 20 mm, for example. In other words, the control unit 10 controls the lens 4 with the target value of the focal position Zf set to 20 mm. In this case, if the workpiece distance Dw has not deviated from the target value, the laser diameter Ld becomes 900 µm. While maintaining this state, the welding apparatus 1 radiates the laser beam 20 to the welding position 100b for a predetermined duration (e.g., approximately 0.1 second).

FIG. 9 is a view for describing a case where the workpiece distance Dw has deviated from the target value while laser welding is performed by the laser welding method according to Embodiment 1 (FIG. 7). FIG. 9 illustrates a case where the workpiece distance Dw has deviated in the direction of increasing from the target value. Specifically, FIG. 9 illustrates a case where the focal position Zf has deviated +10 mm from the target value (the focal position Zf has deviated 10 mm in the direction of increasing from the target value).

In step S11, the focusing direction (the direction of the position of the focal spot 22 relative to the workpiece 100) is the near-focusing direction, and the target value of the focal position Zf is 30 mm. In this case, if the focal position Zf deviates +10 mm from the target value, the actual focal position Zf becomes 40 mm. Then, the actual laser diameter Ld becomes 1700 µm. Here, the target value of the laser diameter Ld being 1300 µm, the laser diameter Ld has increased from the target value.

In step S12, the focusing direction is the far-focusing direction and the target value of the focal position Zf is -20 mm. In this case, if the focal position Zf deviates +10 mm from the target value, the actual focal position Zf becomes -10 mm. Then, the actual laser diameter Ld becomes 500 µm. Here, the target value of the laser diameter Ld being 900 µm, the laser diameter Ld has decreased from the target value.

In step S13, the focusing direction is the far-focusing direction and the target value of the focal position Zf is -30 mm. In this case, if the focal position Zf deviates +10 mm from the target value, the actual focal position Zf becomes -20 mm. Then, the actual laser diameter Ld becomes 900 µm. Here, the target value of the laser diameter Ld being 1300 µm, the laser diameter Ld has decreased from the target value.

In step S14, the focusing direction is the near-focusing direction and the target value of the focal position Zf is 20 mm. In this case, if the focal position Zf deviates +10 mm from the target value, the actual focal position Zf becomes 30 mm. Then, the actual laser diameter Ld becomes 1300 µm. Here, the target value of the laser diameter Ld being 900 µm, the laser diameter Ld has increased from the target value.

FIG. 10 is a view for describing a case where the workpiece distance Dw has deviated from the target value while laser welding is performed by the laser welding method according to Embodiment 1 (FIG. 7). FIG. 10 illustrates a case where the workpiece distance Dw has deviated in the direction of decreasing from the target value. In FIG. 10, a case is illustrated where the focal position Zf has deviated -10 mm from the target value (the focal position Zf has deviated 10 mm in the direction of decreasing from the target value).

In step S11 (near focusing), if the focal position Zf deviates -10 mm from the target value, the actual focal position Zf becomes 20 mm. In this case, the actual laser diameter Ld becomes 900 µm. Thus, the laser diameter Ld has decreased from the target value. In step S12 (far focusing), if the focal position Zf deviates -10 mm from the target value, the actual focal position Zf becomes -30 mm. In this case, the actual laser diameter Ld becomes 1300 µm. Thus, the laser diameter Ld has increased from the target value.

In step S13 (far focusing), if the focal position Zf deviates -10 mm from the target value, the actual focal position Zf becomes -40 mm. In this case, the actual laser diameter Ld becomes 1700 µm. Thus, the laser diameter Ld has increased from the target value. In step S14 (near focusing), if the focal position Zf deviates -10 mm from the target value, the actual focal position Zf becomes 10 mm. In this case, the actual laser diameter Ld becomes 500 µm. Thus, the laser diameter Ld has decreased from the target value.

Thus, in Embodiment 1, whether the focal position Zf deviates from the target value in the positive direction or the negative direction due to the deviation of the workpiece distance Dw, it is possible to perform laser welding by combining the state in which the actual laser diameter Ld is larger than the target value and the state in which the actual laser diameter Ld is smaller than the target value. In this way, even when the focal position Zf deviates from the target value, a constantly raised state or a constantly lowered state of the energy density at the welding position 100b is prevented. As a result, the state of the energy density at the welding position 100b is stabilized. Thus, in Embodiment 1, it is possible to perform welding properly even when the workpiece distance deviates from the target value.

Comparative Example

A comparative example of the embodiment will be described below. In the comparative example, laser welding is performed at a certain welding position 100b in the focusing direction of only one of the near-focusing direction and the far-focusing direction. The comparative example is otherwise the same as Embodiment 1. Here, in the comparative example, steps S11 to S14 shown in FIG. 7 are replaced with steps S101 to S104. Referring to FIG. 11 and FIG. 12, a case where the focusing direction is the near-focusing direction in all steps S101 to S104 will be described below.

FIG. 11 is a view for describing a case where the workpiece distance Dw has deviated from the target value while laser welding is performed by the method according to the comparative example. As with FIG. 9, FIG. 11 illustrates a case where the workpiece distance Dw has deviated in the direction of increasing from the target value. Specifically, as with FIG. 9, FIG. 11 illustrates a case where the focal position Zf has deviated +10 mm from the target value.

In step S101, the focusing direction is the near-focusing direction and the target value of the focal position Zf is 30 mm. In this case, if the focal position Zf deviates +10 mm from the target value, the actual focal position Zf becomes 40 mm. Then, the actual laser diameter Ld becomes 1700 µm. Here, the target value of the laser diameter Ld being 1300 µm, the laser diameter Ld has increased from the target value.

In step S102, the focusing direction is the near-focusing direction and the target value of the focal position Zf is 20 mm. In this case, if the focal position Zf deviates +10 mm from the target value, the actual focal position Zf becomes 30 mm. Then, the actual laser diameter Ld becomes 1300

μm. Here, the target value of the laser diameter Ld being 900 μm, the laser diameter Ld has increased from the target value.

Step S103 is substantially the same as step S101. Accordingly, in step S103, the laser diameter Ld has increased from the target value. Step S104 is substantially the same as step S102. Accordingly, in step S104, the laser diameter Ld has increased from the target value. Thus, in the comparative example, whenever the focal position Zf deviates from the target value in the positive direction, the laser diameter Ld increases from the target value.

FIG. 12 is a view for describing a case where the workpiece distance Dw has deviated from the target value when laser welding is performed by the method according to the comparative example. As with FIG. 10, FIG. 12 illustrates a case where the workpiece distance Dw has deviated in the direction of decreasing from the target value. Specifically, as with FIG. 10, FIG. 12 illustrates a case where the focal position Zf has deviated −10 mm from the target value.

In step S101, if the focal position Zf deviates −10 mm from the target value, the actual focal position Zf becomes 20 mm. In this case, the actual laser diameter Ld becomes 900 μm. Thus, the laser diameter Ld has decreased from the target value. In step S102, if the focal position Zf deviates −10 mm from the target value, the actual focal position Zf becomes 10 mm. In this case, the actual laser diameter Ld becomes 500 μm. Thus, the laser diameter Ld has decreased from the target value.

Step S103 is substantially the same as step S101. Accordingly, in step S103, the laser diameter Ld has decreased from the target value. Step S104 is substantially the same as step S102. Accordingly, in step S104, the laser diameter Ld has decreased from the target value. Thus, in the comparative example, whenever the focal position Zf deviates from the target value in the negative direction, the laser diameter Ld decreases from the target value.

When the focal position Zf has deviated from the target value, if the laser beam 20 is radiated to the welding position 100b such that the laser diameter Ld becomes constantly larger than the target value, the energy density at the welding position 100b may be in a constantly lowered state as described above. This may result in a lack of fusion into the object to be welded on the rear side of the workpiece and, accordingly, in reduced weld strength.

Conversely, when the focal position Zf has deviated from the target value, if the laser beam 20 is radiated to the welding position 100b such that the laser diameter Ld becomes constantly smaller than the target value, the energy density at the welding position 100b may be in a constantly raised state as described above. This may result in a defect, such as perforation, occurring in the workpiece.

In the laser welding method according to Embodiment 1, by contrast, the laser beam 20 is radiated to the welding position 100b with near focusing and far focusing in combination as described above when laser welding is performed at a certain welding position 100b. In this way, when laser welding is performed at the welding position 100b, the laser diameter Ld being constantly larger than the target value or the laser diameter Ld being constantly smaller than the target value is prevented. Accordingly, even when the focal position Zf deviates from the target value as the workpiece distance Dw deviates from the target value, it is possible to combine the raised state and the lowered state of the energy density at the welding position 100b. In Embodiment 1, therefore, an extreme rise or an extreme decrease in energy density at the welding position 100b is prevented. Thus, in Embodiment 1, the reduction of weld strength due to a lack of fusion into the object to be welded on the rear side of the workpiece as well as a defect, such as perforation, occurring in the workpiece are prevented. That is, in Embodiment 1, it is possible to perform welding properly even when the workpiece distance deviates from the control-target distance.

Modified Example

The present invention is not limited to the above embodiment but can be appropriately modified within the scope of the invention. For example, the workpiece 100 is composed of a stack of two steel sheets in FIG. 1 etc. However, the workpiece may be composed of a stack of three or more steel sheets. That is, the workpiece is composed of a stack of a plurality of steel sheets (objects to be welded).

In the above embodiment, the control unit 10 of the welding apparatus 1 stores in advance the target value of the workpiece distance Dw and the target value of the focal position Zf for each welding position 100b in the workpiece 100. However, the control unit 10 does not have to store the target values in advance. In this case, the control unit 10 may receive the target values from a control device outside the welding apparatus 1.

The laser radiation unit 2 is a three-dimensional scanner in the above embodiment, but the laser radiation unit 2 is not limited to a three-dimensional scanner. For example, the laser radiation unit 2 may be a two-dimensional scanner. In this case, the control unit 10 may move the laser radiation unit 2 itself closer to or away from the workpiece 100, instead of moving the lens 4 according to Embodiment 1. On the other hand, the welding apparatus 1 according to Embodiment 1 is configured to move the lens 4 built in the three-dimensional scanner, and thus it is not required to move the laser radiation unit 2 to perform the control in steps S11 to S14 shown in FIG. 7. In Embodiment 1, therefore, it is possible to control the focal spot to be in the near-focusing state and the far-focusing state more easily.

The sequence of the process shown in FIG. 7 can be appropriately modified. For example, the control unit 10 may first control the focal spot to be in the near-focusing state and control the focal spot to be in the far-focusing state, and then control the focal spot to be in the near-focusing state instead of the far-focusing state. Moreover, the step of controlling the focal spot to be in the near-focusing state and the step of controlling the focal spot to be in the far-focusing state are each performed twice in FIG. 7, but each step may be performed once.

In the above embodiment, the number of times of performing the step of controlling the focal spot to be in the near-focusing state and the number of times of performing the step of controlling the focal spot to be in the far-focusing state are the same (two). However, these numbers of times do not have to be the same. As long as the energy density at the welding position 100b is stabilized, the number of times of performing the step of controlling the focal spot to be in the near-focusing state and the number of times of performing the step of controlling the focal spot to be in the far-focusing state may be different from each other. For example, the duration of radiation of the laser beam in the step of which the number of times is smaller may be longer than the duration of radiation in the step of which the number of times is larger.

Nevertheless, if the number of times of performing the step of controlling the focal spot to be in the near-focusing state and the number of times of performing the step of controlling the focal spot to be in the far-focusing state are the same, the same duration of radiation can be used in both steps. This allows easy control in both steps. Thus, it is possible to stabilize the energy density at the welding position 100b more easily by setting the number of times of performing the step of controlling the focal spot to be in the near-focusing state and the number of times of performing the step of controlling the focal spot to be in the far-focusing state to the same number of times.

What is claimed is:

1. A laser welding method of joining together a plurality of objects to be welded by performing laser welding with a welding apparatus that radiates a laser beam to a workpiece composed of a stack of the plurality of objects to be welded, the laser welding method comprising:
    when performing laser welding at a first welding position of the workpiece, radiating the laser beam to the first welding position in a state where a position of a focal spot of the laser beam is closer to the welding apparatus than a laser-radiated surface of the workpiece is; and
    when performing laser welding at the first welding position of the workpiece, radiating the laser beam to the first welding position in a state where the position of the focal spot of the laser beam is farther away from the welding apparatus than the laser-radiated surface of the workpiece is.

2. The laser welding method according to claim 1, wherein the position of the focal spot of the laser beam is controlled by moving a lens provided in the welding apparatus.

3. The laser welding method according to claim 1, wherein the number of times of radiating the laser beam to the first welding position in the state where the position of the focal spot of the laser beam is closer to the welding apparatus than the laser-radiated surface of the workpiece is the same as the number of times of radiating the laser beam to the first welding position in the state where the position of the focal spot of the laser beam is farther away from the welding apparatus than the laser-radiated surface of the workpiece is.

4. The laser welding method according to claim 1, wherein, before laser welding is performed at the first welding position of the workpiece, the position of the focal spot is controlled such that a distance from a laser radiation end to the position of the focal spot equals a distance obtained by subtracting a target value of the position of the focal spot from a target value of the distance to the workpiece.

* * * * *